United States Patent [19]

Clark et al.

[11] Patent Number: 4,912,157
[45] Date of Patent: Mar. 27, 1990

[54] INK COMPOSITIONS AND PREPARATION

[75] Inventors: Gary T. Clark; John N. Rasar; Rebecca R. Stockl, all of Kingsport, Tenn.

[73] Assignee: Eastman Kodak Company, Rochester, N.Y.

[21] Appl. No.: 187,712

[22] Filed: Apr. 29, 1988

Related U.S. Application Data

[63] Continuation of Ser. No. 50,665, May 18, 1987, abandoned.

[51] Int. Cl.$^4$ .......................... C08K 5/06; C08K 5/54
[52] U.S. Cl. .................................... 524/265; 524/215; 524/220; 524/243; 524/244; 524/245; 524/368; 524/375; 524/376; 524/377; 524/603
[58] Field of Search .................... 524/368, 603, 265

[56] References Cited

U.S. PATENT DOCUMENTS

| | | |
|---|---|---|
| 3,546,008 | 12/1970 | Shields et al. |
| 3,563,942 | 2/1971 | Heiberger |
| 3,607,813 | 9/1971 | Purcell et al. |
| 3,779,993 | 12/1973 | Kibler et al. |
| 3,907,736 | 9/1975 | Barton |
| 4,022,740 | 5/1977 | Morie et al. |
| 4,072,644 | 2/1978 | Hedrick |
| 4,073,777 | 2/1978 | O'Neil et al. |
| 4,156,073 | 5/1979 | Login |
| 4,304,900 | 12/1981 | O'Neil |
| 4,304,901 | 12/1981 | O'Neill et al. |
| 4,335,220 | 6/1982 | Coney |
| 4,365,035 | 12/1982 | Zabiak |
| 4,525,524 | 6/1985 | Tung et al. |
| 4,595,611 | 6/1986 | Quick |
| 4,632,874 | 12/1986 | Smith |
| 4,680,332 | 7/1987 | Hair et al. |
| 4,704,309 | 11/1987 | Coney et al. |

FOREIGN PATENT DOCUMENTS

| | | | |
|---|---|---|---|
| 2903022 | 7/1980 | Fed. Rep. of Germany | |
| 10663 | 1/1982 | Japan | 524/603 |
| 65766 | 4/1982 | Japan | 524/377 |
| 2097005 | 10/1982 | United Kingdom | |

OTHER PUBLICATIONS

Union Carbide product literature entitled "Silwet ® Surface Active Copolymers".
Air Products product literature entitled "Specialty Additives Applications Guide".
DuPont product literature related to Zonyl ® Fluorosurfactants.
Research Disclosure No. 24222 dated Jun. 1984.
Defensive Publication T-949001 dated 08/03/76.

*Primary Examiner*—John C. Bleutge
*Assistant Examiner*—David W. Woodward
*Attorney, Agent, or Firm*—William P. Heath, Jr.; Thomas R. Savitsky; Mark A. Montgomery

[57] ABSTRACT

A composition useful in printing inks exemplified as comprising:

(1) from about 4 to about 80% by weight of one or more polyester materials having an acid component of from about 75 to about 84 mole % isophthalic acid and conversely from about 25 to about 16 mole % 5-sodiosulfoisophthalic acid, and having a glycol component of from about 45 to about 60 mole % diethylene glycol and conversely from about 55 to about 40 mole % 1,4-cyclohexanedimethanol or ethylene glycol or mixtures thereof;
(2) from about 1.0 to about 60% by weight of pigment material;
(3) from about 0.05 to about 30% by weight of a nonionic, polyether type property modifier; and
(4) from substantially none to about 90% by weight of water.

8 Claims, No Drawings

INK COMPOSITIONS AND PREPARATION

This is a continuation of application Ser. No. 050,665 May 18, 1987.

TECHNICAL FIELD

This invention concerns pigmented, aqueous inks and their non or semi-aqueous concentrates containing property modifiers unexpectedly enhancing flow-out, print smoothness, gloss, uniformity, homogeniety, optical density, printability and the like wherein the pigment carrier or binder comprises water dispersible polyester material. The present inks find special utility for letter press, intaglio, gravure, flexographic and other printing processes adaptable to the use of aqueous inks. The term "ink" is used herein in its broad sense as including the use thereof for coatings in all forms such as characters, letters, patterns and coatings with and without designs.

BACKGROUND OF THE INVENTION

The printing industry, in general, finds many applications for the use of water-based inks and overprint varnishes as a means of meeting increasingly stringent solvent effluent regulations. Present-day water-based inks often fail to satisfy these regulations as well as the necessary printability, stability, and performance properties required for commercial inks. For example, the various ethylene-acrylic acid copolymer salts of U.S. Pat. No. 3,607,813, the disclosure of which is incorporated herein by reference (for the printing process descriptions therein), in addition to requiring complex polymer and ink preparations, lack in performance on certain substrates. Other such aqueous or semiaqueous systems proposed for printing inks contain polymers such as styrene-butadiene or polyacrylate latex systems but these systems also have serious drawbacks including being nondispersible in their aqueous media after short drying periods which complicates equipment clean up. Other water soluble or dispersible polymers suggested for printing ink use are disclosed in U.S. Pat. No. 4,072,644.

The present invention provides substantial improvements in the preparation, stability, and performance of water-based inks for printing and coating, particularly in regard to flow-out, smoothness, uniformity and optical density on a great variety of substrates.

DESCRIPTION OF THE INVENTION

The invention in its broad composition of matter embodiment is defined as a composition useful as a printing ink or useful for the preparation of printing inks comprising a substantially homogeneous system of the components:

(1) from about 4 to about 80 weight %, preferably (for the press-ready ink) from about 10 to about 30 weight % of polymeric material of at least one linear water-dissipatable polymer having carbonyloxy linking groups in the linear molecular structure wherein up to 80% of the linking groups may be carbonylamido linking groups, the polymer having an inherent viscosity of from about 0.1 to about 1.0, preferably from about 0.1 to about 0.5 measured in a 60/40 parts by weight solution of phenol/tetrachloroethane at 25° C. and at a concentration of 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c), and (d) from the following reactants or ester forming or ester-amide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal cationic group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups of which (1) at least 15 mole percent based on the total mole percent of hydroxy or hydroxy and amino equivalents, is a poly(ethylene glycol) having the structural formula

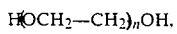
H(OCH$_2$—CH$_2$)$_n$OH, n being an integer of from 2 to about 20, or (2) of which from about 0.1 to less than about 15 mole percent based on the total mole percent of hydroxy or hydroxy and amino equivalents, is a poly(ethylene glycol) having the structural formula H(OCH$_2$—CH$_2$)$_n$OH, n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of of said difunctional reactants;

wherein each R in the (c) or (d) reactants is a H atom or an alkyl group of 1 to 4 carbon atoms;

(2) from about 1 to about 60 weight % of pigment material;

(3) from about 0.01 to about 30.0 weight % total of one or more property modifiers selected from the following:

(e) one or a mixture of compounds of the general formula

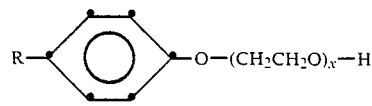

wherein x is 1-50, preferably 3-30, and R is straight or branched alkyl of 1-20 carbons, preferably 6-12 carbons, and most preferably 9 carbons;

(f) one or a mixture of compounds of the general formula

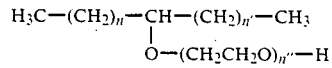

wherein n is 11 to 15, n' is from 0 to 10 and n" is from 1 to 50;

(g) one or a mixture of compounds of the general formula

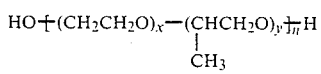

wherein x is from 1 to 50, y is from 1 to 50, and n is from 2 to 25;

(h) one or a mixture of compounds of the formula

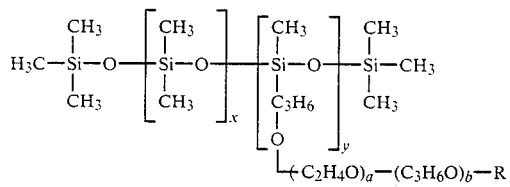

wherein R is hydrogen or alkyl of 1–8 carbons, x is 1 to 50, y is 1 to 50, a is 2 to 30, and b is 2 to 30;

(i) one or a mixture of compounds of the formula

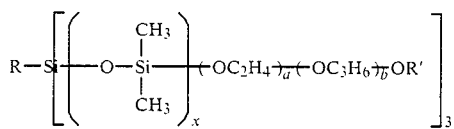

wherein R and R' are each alkyl of 1–8 carbons, x is 1 to 50, a is 2 to 35, and b is 2 to 35;

(j) one or a mixture of compounds of the formula $R-C\equiv C-R^1$ wherein R and $R^1$ are each selected from straight and branched alkyl of 1–15 carbons wherein at least one of R and $R^1$ carries from 1–3 hydroxyl groups wherein the H of each said hydroxyl group is independently unsubstituted or substituted with a substituent of the formula $$\text{(CH}_2-\text{CH}_2-\text{O)}_n\text{H or (CH}_2-\text{CH(CH}_3)-\text{O)}_m\text{H}$$

wherein n and m are each from 1 to about 50 and the total of these substituents present is such that the total of n and m is less than about 60, wherein each of n and m preferably is from about 3 to about 35;

(k) one or a mixture of compounds of the formula

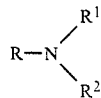

wherein R is straight or branched alkyl of 1 to 20 carbons, one of $R^1$ and $R^2$ may be H, and each of $R^1$ and $R^2$ is further selected from the substituents $(CH_2-CH_2-O)_n H$ or $(CH_2-CH(CH_3)-O)_m H$ wherein each of n and m is from 1 to about 50, preferably from about 3 to about 35, and the total of these substituents present is such that the total of n and m is less than about 60;

(l) one or a mixture of compounds of the formula

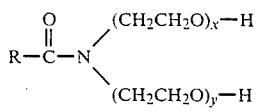

wherein R is straight or branched alkyl of 6–20 carbons, and each of x and y is from 1–50, preferably from 3–30;

(m) one or a mixture of compounds of the formula $$F(CF_2CF_2)_{3-8}CH_2CH_2O-CH_2CH_2-O_x H$$

wherein x is from 1–50, preferably from 3–30;

(n) one or a mixture of compounds of the formula

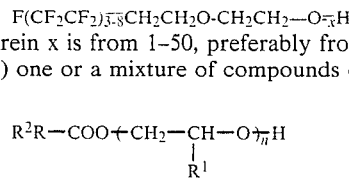

wherein R is straight or branched alkyl of 6–20 carbons, $R^1$ is H or methyl, n is 1–50, preferably 3–30, and $R^2$ is H or hydroxyl; and (o) one or a mixture of compounds of the formula $$HOCH_2(CH_2OCH_2)_n CH_2OH$$

wherein n is from about 3 to about 300, preferably from about 5 to about 80; and (4) from substantially none (for full concentrate) to about 90 weight %, most preferably for the press-ready inks from about 65 to about 75 weight % of water.

In the above polymeric material, it is preferred that very minor, e.g., less than about 10 mol % based on all reactants, of reactant (d) is employed, that at least about 70 mol % of reactant (c) is glycol, and that at least about 70 mol % of all the hydroxy equivalents is present in the glycol.

It is noted that in the above property modifiers in which mixed ether repeating moieties or units are present as shown for example in the formula for (g), these moieties can be positioned randomly in the molecule or can be blocked as depicted by the structural formula, depending on whether the reactant oxides, e.g., ethylene oxide and propylene oxide are simultaneously present in the reaction system, or whether they are fed separately thereto in sequence. Such chemistry is well known to the art and the structural formulas given above are intended to encompass both random and blocked repeating moieties or units.

The viscosities of the inks may, of course, range widely, e.g., from about 15 to about 60 seconds as measured in a #2 Zahn cup according to ASTM D-4212-82. The higher viscosities, e.g. from about 22 to about 60 seconds and lower water levels, e.g. from about 20 to about 55% represent semi-aqueous concentrated forms of the present inks. In this regard, in order to reduce the viscosities of these inks when necessary for certain printing apparatus and processes varying amounts of water are added. In this water addition, the ink viscosity may be reduced up to about 60% of its original concentrate value, and the press-ready ink viscosity preferably ranges between about 15 and 30 seconds in a number 2 Zahn cup.

It is preferred that the inherent viscosity of the polymeric material be from about 0.28 to about 0.38, and that said material be comprised of (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol or mixtures thereof, and wherein the weight ratio of pigment material to said polymeric material be from about 1/10 to about 2/1. The term "moiety" as used herein with regard to the polymeric material, designates the residual portion of the reactant acid or glycol which actually enters into or onto the polymer chain during the condensation or polycondensation reaction.

Further preferred embodiments of the invention are as follows:

(1) the said acid component (moiety) of the polymeric material comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

(2) the property modifier is selected from one or more compounds of the formula

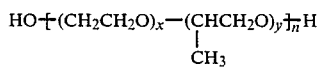

wherein x is from 1 to 50, y is from 1 to 50, and n is from 2 to 25;

(3) the polymeric material comprises from about 4 to about 30, most preferably from about 10 to about 25 weight %, the pigment material comprises from about 1 to about 20, most preferably from about 8 to about 15 weight %, the water comprises from about 55 to about 90, most preferably from about 65 to about 75 weight %, and the total property modifier comprises from about 0.05 to about 10, most preferably from about 0.1 to about 7 weight %;

(4) the pigment is one or a mixture of the following color index materials according to their generic names: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3;

(5) the aqueous ink is coated or printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polyolefin, or polystyrene;

(6) the method for preparing the ink comprises the steps of:

(a) dispersing said polymeric material in deionized water;

(b) adding said property modifier to the dispersion of (a) with agitation to obtain a substantially homogeneous mixture;

(c) adding said pigment to the mixture of (b) with agitation to form a predispersion blend; and (d) grinding the blend of (c) to reduce the pigment particle size to less than about 6.0 on the NPIRI scale; and (7) said coating or print comprises any of the above ink compositions wherein a substantial portion of the initial metal cations of the water solubilizing sulfonate groups of the polymeric material has been replaced with an insolubilizing polyvalent metal cation, such as $Al^{+3}$, $Ca^{++}$, or the like as disclosed and in the manner described in U.S. Pat. No. 4,145,469, the disclosure of which is incorporated herein by reference. As stated therein, generally, based on the weight of the polymeric material, 0.05% to about 2.0% by weight of the polyvalent metal cation are required for effective insolubilization; and (8) the weight ratio of water to total modifier in the press-ready ink is from about 10 to about 180.

The complete chemical definitions of the above C. I. pigments are given in the following table:

| Generic Name | Pigments C.A. Index/Chemical Name |
|---|---|
| C.I. Pigment Yellow 17 | Butanamide. 2,2'-[(3,3'-dichloro[1,1'-biphenyl]-4,4'-diyl)bis(azo)bis[N-(2-methoxyphenyl)-3-oxo- |
| C.I. Pigment Blue 27 | Ferrate (4-1), hexakis (cyano-C)-ammonium iron $(3+)(1:1:1)$ |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[(6-ethylamino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-, ethyl ester, molybdate-silicate |
| C.I. Pigment Red 81:x | Benzoic acid, 2-[6-(ethylamino)-3-(ethylimino)-2,7-dimethyl-3H-xanthen-9-yl]-ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3'.2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethylamino)-3H-xanthen-3- |

-continued

| Pigments | |
|---|---|
| Generic Name | C.A. Index/Chemical Name |
| | ylidene]-N-ethyl-, molybdatetungstatephosphate |
| C.I. Pigment White 6 | Titanium oxide (TiO$_2$) |
| C.I. Pigment Blue 15 | Copper, [29H, 31H-phthalocyaninato (2-)-N$^{29}$, N$^{30}$, N$^{31}$, N$^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1)- |

The pigments useful in the present invention, in addition to those specifically identified above, include those described in NPIRI Raw Materials Data, Vol. 4, Pigments, Copyright 1983.

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a ½ ml. capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n)\ 25°\ C. = \frac{\ln \frac{t_s}{t_o}}{C}\ \ 0.50\%$$

where:

(n) = inherent viscosity at 25° C. at a polymer concentration of 0.25 g/100 ml. of solvent;

ln = natural logarithm;

$t_s$ = sample flow time;

$t_o$ = solvent-blank flow time; and

C = concentration of polymer in grams per 100 ml. of solvent = 0.25.

The units of the inherent viscosity throughout this application are in deciliters/gram. It is noted that higher concentrations of polymer, e.g., 0.50 g of polymer/100 ml solvent may be employed for more precise I.V. determinations.

In general, the water dissipatable polyester materials useful in the present invention are excellent film formers for water-based printing inks. The polymers form stable dispersions in water and produce tough, flexible films on drying, wherein the films will form at temperatures down to just above the freezing point of water. The polymers in dispersion form may be plasticized if necessary, for example, with certain water immiscible phthalate esters to high degrees of flexibility. Printing inks prepared from the aqueous dispersed polymers are readily further water reducible. The inks dry rapidly upon printing, wet surfaces exceptionally well and have excellent adhesion to many plastic films and metal foil as well as to paper, polyolefin, glass and many other substrates. Both the 100% solid, water-dissipatable polymers and the corresponding aqueous dispersions thereof may be pigmented by conventional techniques, and the property modifier may be added prior to or during blending of the pigment with the 100% solid polymer or its aqueous dispersion, and pigment or the modifier may be added to the pre-formed aqueous polymer-pigment dispersion by suitable mixing. It is preferred to add the property modifier to the aqueous polymer dispersion prior to pigment addition and grinding as marked improvement in color development, smoothness and gloss in the print are effected. The prints have moderate water resistance upon heating and may be post-treated to produce films with excellent resistance to water, for example, with an aqueous alum solution or the like cation. In this regard, the use of deionized water in the present inks is preferred in order to prevent premature ion exchange on the sulfonate groups. Conventional biocides, defoamers and the like may be used in conventional manner.

The aforedescribed polyester material is prepared according to the polyester preparation technology described in U.S. Pat. Nos. 3,734,874; 3,779,993; and 4,233,196, the disclosures of which are incorporated herein by reference, and the use of the term "acid" in the above description and in the appended claims includes the various ester forming or condensable derivatives of the acid reactants such as the dimethyl esters thereof as employed in the preparations set out in these patents. Among the preferred sulfo-monomers are those wherein the sulfonate group is attached to an aromatic nucleus such as benzene, naphthalene, diphenyl, or the like, or wherein the nucleus is cycloaliphatic such as in 1,4-cyclohexanedicarboxylic acid.

Dispersal of the present polyester material in water is preferably done at preheated water temperature of about a 180° to about 200° F. and the polymer added slowly as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25-30%, but generally increase sharply above these levels. Viscosities of the dispersions will be influenced by the degree of polymer dispersion (fineness) obtained which is affected by the dispersing temperature, shear, and time. A typical nonvolatile content for the aqueous dispersions for most applications is from about 28 to about 38% for the preferred polyester material.

The present concentrates and inks may also be prepared by milling, e.g., two-roll milling the finely comminuted, nonpolymer soluble pigment and modifier into the solid polyester material and thereafter dispersing the milled material in water in a manner generally similar to the procedure described in U.S. Pat. No. 4,148,779 for solubilizing organic disperse textile dyes in polyester for subsequent dispersal in water. Dispersions can also be made by adding the pigment at high speed agitation to the polyester material previously dispersed in water and then grinding in a ball mill or sand mill to further reduce pigment size. The presence of the modifier in this operation is preferred. The preferred pH of the present inks is from about 5.0 to about 7.5.

The following examples will further illustrate practice of the invention.

POLYESTER PREPARATION

EXAMPLE 1

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 ml of a 1.0% by weight (based on Ti) catalyst solution of titanium tetraisopropoxide, and 0.74 g (0.009 mole) of sodium acetate buffer is stirred and heated for two hours at 200°–200° C. The temperature is then raised to 275° C. and a vacuum of 0.3 mm is applied. Heating and stirring is continued for 1 hour under these conditions. After cooling, the polymer obtained has an I.V. of 0.36 and is tough and rubbery and is dissipatable in hot water to the extent of about 25 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

In accordance with the present invention, inks prepared from the above polyester material and including the property modifier and polymer insoluble pigments have been found to be unexpectedly superior over prior aqueous inks in one or more of such properties as flow-out or printability, pigment wetting, pigment stability, temperature stability (heat and freeze-thaw), non-settling for extended periods of time, non-polluting with respect to odor and volatile organics, nonflocculating, wide viscosity range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility redispersibility or rewetting, crinkle resistance, high pigment loading, solvent resistance, alkali, chemical and detergent resistance, blocking resistance, lightfastness, toughness, substrate wetting, hold-out, opacity, dryrate, and no offset on the printing press (coating, e.g. on tension rollers).

The following Example 2 is a typical preparation of a control ink against which the inks of the present invention may be compared in performance:

INK PREPARATION

EXAMPLE 2

| Control Ink (No Modifier) | Weight % |
| --- | --- |
| Deionized Water | 60.8 |
| Polymer of Example 1 | 24.0 |
| Carbon Black, Pigment C.I. 7 | 15.0 |
| Biocide, Tektamer 38 AD (1,2-dibromo-2,4-dicyanobutane) | 0.2 |

The solid polymer (32 parts) is dispersed in approximately 68 parts of deionized water at 85° C. to 95° C. and 0.2 parts of biocide added. To 75 parts of this dispersion is added 10 parts of deionized water and 15 parts of the carbon black at high speed agitation for five minutes on a Waring Blender. The mixture is then milled in an Eiger mill operated at about 5,000 rpm for about 7.5 minutes to further reduce the pigment for a grind of less than about "2" and approaching "0" NPIRI grind gauge. The resulting composition has a pH of about 5.6 and a viscosity of 26–29 seconds on a #2 Zahn cup determined according to ASTM D-4212-82. This ink is reduced to press-ready viscosity of about 22 seconds (#2 Zahn cup) by adding about 5 parts of deionized water thereto.

In the following examples a hand proofer is employed which provides reasonable facsimiles of prints obtained by the flexographic printing processes as discussed in the aforesaid U.S. Pat. No. 3,607,813 and is typically used to prepare roll-outs or proofs for laboratory testing on a wide variety of substrates. The wire-wound rod is typically used to prepare drawdowns of inks on a variety of substrates. These rods apply a uniform wet-film thickness to the substrate, and after drying, the draw-downs are ready for testing. Typically 2.5–8 number wire wound draw-down rods are employed. For exemplary details of such proofer equipment and use, see the publication "Gardco 1983–1984 Handbood of Paint Testing, Corrosion Control and Laboratory Instruments" of the Paul N. Gardner Company, Inc., 281 D Commercial Blvd., Suite 205 Lauderdale by the Sea, Fla. 33308-4491, a copy of which accompanies this application.

EXAMPLE 3

A control ink is prepared as described in Example 2, having the following composition:

| Ingredient | Weight % |
| --- | --- |
| Polymer of Example 1 | 20 |
| Carbon Black Pigment C.I. 7 | 15 |
| Deionized Water | 65 |

Proofs of this ink were prepared with a flexographic handproofer employing a 180-line anilox roll and with a Geiger Gravure proof press using a 150-line engraved cylinder. This ink has poor printability, optical density, uniformity and homogeneity when printed on 30 pound newsprint stock.

EXAMPLE 4

When small amounts of the water in the control ink of Example 3 is replaced with the property modifiers in the amounts shown below, smoother and darker proofs showing vast improvement in the above properties, particularly uniformity are obtained on 30-pound newsprint stock versus the control.

| | Modifier |
|---|---|
| 1.6% | Silwet L-7607 - (from Union Carbide) polyalkylene oxide of dimethyl poly siloxane, formula (h) above |
| 3.2% | Silwet L-7607 |
| 5.0% | Emulphogene DA-630 - (from General Aniline & Film) ethoxylated tridecyl alcohol, formula (f) above |
| 5.0% | Emulphogene BC-610 - (from General Aniline & Film) ethoxylated tridecyl alcohol, formula (f) above. |
| 5.0% | Pluronic L61 - (from BASF) copolymer of propylene and ethylene oxide according to formula (g) above. |

EXAMPLE 5

| Ingredient | Weight % in Press-Ready Ink |
|---|---|
| Polymer of Example 1 | 10 |
| Carbon Black, Pigment C.I. 7 | 20 |
| Foamaster V (antifoam) | 1 |
| Water | 69 |

A draw down of the above control ink made with a 2.5 wire wound rod on coated and uncoated paper (Penopac stock) does not produce a smooth, continuous film on the coated portion of the stock. The addition, however, in accordance with the present invention, of 3 wt. % (based on total ink weight) of Surfynol 440, an ethoxylated acetylenic glycol of formula (j) above, by stirring into the above ink gives smooth, continuous, uniform, homogeneous film on the coated portion of the Penopac stock.

EXAMPLE 6

A control ink is prepared as described in Example 2, having the following composition:

| Ingredient | Weight % |
|---|---|
| Polymer of Example 1 | 20 |
| Carbon Black, Pigment C.I. 7 | 14 |
| Reflex Blue R-51 (C.I. Pigment Blue 61) | 1 |
| Foamaster V (antifoam) | 1 |
| Water | 64 |

Proofs of this ink were prepared with a flexographic handproofer employing a 180-line anilox roll and with a Geiger Gravure proof press using a 150-line engraved cylinder. This ink has poor printability, optical density, uniformity and homogeneity when printed on 30 pound newsprint stock.

When 5% of the water in the above ink is replaced in accordance with the present invention, with Pluronic L61, a copolymer of ethylene oxide and propylene oxide of formula 3(g) above, a smoother and darker draw down is obtained with a hand proofer on 30 lb. newsprint stock or other paper stocks versus that obtained by the control ink. Also, the ink containing the Pluronic L61 followed the roller of the hand proofer whereas the control ink did not.

EXAMPLE 7

Polyesters designated (A), (B), (C) and (D) were prepared essentially in accordance with Example 1 of the aforementioned U.S. Pat. No. 4,233,196 from the following materials:

| (A) | g. moles | |
|---|---|---|
| Dimethyl Isophthalate (IPA) | 0.415 | |
| Dimethyl-5-Sodiosulfoisophthalate (SIP) | 0.085 | |
| 1,4-Cyclohexanedimethanol (CHDM) | 0.520 | |
| Carbowax 1000 (CW 1000) | 0.0273 | |
| Sodium Acetate | 0.0085 | |
| Irganox 1010 | 0.1 | wt. % |

The Carbowax 1000 has the structure HOCH$_2$—CH$_2$)$_n$OH wherein n is about 22. The polymer analyzed by NMR contains (in reacted form) about 83 mole % IPA, about 17 mole % SIP, about 94.5 mole % CHDM, and about 5.5 mole % of CW 1000, and has an I.V. of about 0.39.

| (B) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole % IPA, about 18 mole % SIP, about 85.5 mole % CHDM and about 14.5 mole % CW 400, and has an I.V. of about 0.46.

| (C) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer as analyzed by NMR contains (in reacted form) about 82 mole % IPA, about 18 mole % SIP, about 99.9 mole % CHDM and about 0.1 mole % CW 4000, and has an I.V. of about 0.16.

| (D) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer as analyzed by NMR contains (in reacted form) about 82 mole % IPA, about 18 mole % SIP, about 85.5 mole % EG, and about 14.5 mole % CW 2000, and has an I.V. of about 0.34.

In these polymers containing the Carbowax material, the n value is preferably between about 6 and 150.

Inks prepared from these polyesters as in Example 4, using the same modifiers and proportions, show similar printing improvements for a variety of end uses.

EXAMPLE 8

Several additional inks were made as described above, each comprising 19.2 wt. % of the polymer of Example 1, 12.0 wt. % carbon black, and each of Pluronic L-61 Silwet L-7607 (separately) in concentrations of 1.0, 3.0, 5.0, 10.0, 15.0, and 20.0 % by wt., the remainder being deionized water. These inks were coated onto aluminum foil, Mylar, polyethylene (corona discharge treated), newspaper, regular bond paper, PENOPAC, and Kraft paper as above. These experiments show that optical density and homogeniety of the coating is greatly improved on porous stock as the concentration of either the Pluronic L-61 or Silwet L-7607 (separately) increases from about 0.5 wt. % to 20.0 wt. % or more, particularly at concentrations above about 5.0 wt. %.

EXAMPLE 9

A further ink was prepared comprising 15.3 wt. % of the polymer of Example 1, 11.9 wt. % Red C.I. 49:2, 5.0 wt. % Pluronic L-61, and the remainder being water. This ink was coated as above onto aluminum foil, polyethylene (corona discharge tested), Mylar and coated paper. These experiments show that the Pluronic L-61 in general improves optical density, gloss and homogeniety of coating.

EXAMPLE 10

Further inks were made comprising 19.2 wt. % of the polymer of Example 1, 12.0 wt. % carbon black, Emulphogene DA-630 in concentrations of 0.05, 0.1, 0.2, 0.3, 0.5, and 1.0 wt. %, and the remainder being water. These inks were coated onto the same substrates as in Example 9. These experiments show that most noticeably, the gloss and homogeniety improves on aluminum foil, the gloss improves on Mylar, the printability improves on the polyethylene, and the optical density and homogeniety improves on the porous substrates.

The invention has been described in detail with particular reference to preferred embodiments thereof, but it will be understood that variations and modifications can be effected within the spirit and scope of the invention.

We claim:

1. A composition useful as or in the preparation of inks comprising a substantially homogeneous system of the components:
    (1) from about 4 about 80% weight % of polymeric material of at least one linear, waterdissipatable polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c) and (d) from the following reactants or ester forming or esteramide forming derivatives thereof;
    (a) at least one difunctional dicarboxylic acid;
    (b) from about 4 to about 25 mole percent, based on a total of all acid, hydroxyl and amino equivalents being equal to 200 mole percent, of at least one difunctional sulfomonomer containing at least one cationic sulfonate group attached to an aromatic or cycloaliphatic nucleus wherein the functional groups are hydroxy, carboxyl or amino;
    (c) at least one difunctional reactant selected from a glycol or a mixture of a glycol and diamine having two —NHR groups, the glycol containing two —CH$_2$—OH groups of which
        (1) at least 15 mole percent based on the total mole percent of hydroxy or hydroxy and amino equivalents, is a poly(ethylene glycol) having the structural formula H(OCH$_2$—CH$_2$)$_n$OH, n being an integer of from 2 to about 20, or
        (2) of which from about 0.1 to less than about 15 mole percent based on the total mole percent of hydroxy or hydroxy and amino equivalents, is a poly(ethylene glycol) having the structural formula H(OCH$_2$—CH$_2$)$_n$OH, n being an integer of between 2 and about 500, and with the proviso that the mole percent of said poly(ethylene glycol) within said range is inversely proportional to the quantity of n within said range; and
    (d) from none to at least one difunctional reactant selected from a hydroxycarboxylic acid having one —C(R)$_2$—OH group, an aminocarboxylic acid having one —NRH group, or an aminoalcohol having one —C(R)$_2$—OH group and one —NRH group, or mixture of said difunctional reactants;
        wherein each R in the (c) or (d) reactants is a H atom or an alkyl group of 1 to 4 carbon atoms;
        (2) from about 1.0 to about 60.0 weight % of pigment material;
        (3) from about 0.01 to about 30 weight % total of one or more property modifiers selected from the following:
    (e) one or a mixture of compounds of the formula

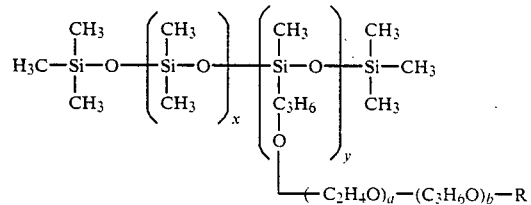

wherein R is hydrogen or alkyl of 1-8 carbons, x is 1 to 50, y is 1 to 50, a is 2 to 30, and b is 2 to 30;

2. The composition of claim 1 wherein the n value of reactant (c)(2) of the formula H(OCH$_2$—CH$_2$)$_n$OH is between 2 and about 20.

3. The composition of claim 2 wherein the polymeric material comprises one or more polyester materials having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and the pigment material is present in a weight ratio with respect to total polyester materials of from about 1/10 to about 2/1 blended with said polyester materials.

4. The composition of claim 3 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

5. The composition of any one of claims 1-4 wherein the pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; or C.I. Pigment Blue 15:3.

6. The composition of claim 5 wherein the polymeric material comprises from about 4 to about 30 weight %, the pigment material comprises from about 1 to about 20 weight %, the water comprises from about 55 to about 90 weight %, and the total property modifier comprises from about 0.05 to about 10.0 weight %.

7. The composition of claim 5 wherein the polymeric material comprises from about 10 to about 25 weight %, the pigment material comprises from about 8 to about 15 weight %, the water comprises from about 65 to about 75 weight %, and the total property modifier comprises from about 0.1 to about 7 weight %.

8. The composition of claim 5 wherein the weight ratio of water to total modifier is from about 10 to about 180.

* * * * *

UNITED STATES PATENT AND TRADEMARK OFFICE
CERTIFICATE OF CORRECTION

PATENT NO. : 4,912,157

DATED : March 27, 1990

INVENTOR(S) : Gary T. Clark, John N. Rasar, and Rebecca R. Stockl

It is certified that error appears in the above-identified patent and that said Letters Patent is hereby corrected as shown below:

In Claim 1, column 14, after line 56, before Claim 2, insert ---(4) from substantially none to about 90 weight % of water.---

Signed and Sealed this

Fifth Day of November, 1991

*Attest:*

HARRY F. MANBECK, JR.

*Attesting Officer*     *Commissioner of Patents and Trademarks*